United States Patent
Kauffmann et al.

(10) Patent No.: US 9,398,061 B2
(45) Date of Patent: Jul. 19, 2016

(54) SIMULATING BROADCAST TELEVISION CHANNEL SURFING FOR ON-DEMAND CONTENT

(71) Applicant: GOOGLE INC., Mountain View, CA (US)

(72) Inventors: Alejandro Jose Kauffmann, San Francisco, CA (US); Hendrik Dahlkamp, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 73 days.

(21) Appl. No.: 14/277,452

(22) Filed: May 14, 2014

(65) Prior Publication Data

US 2015/0334144 A1 Nov. 19, 2015

(51) Int. Cl.
*H04L 29/06* (2006.01)
*H04L 29/08* (2006.01)
*H04N 21/6408* (2011.01)
*H04N 21/6405* (2011.01)
*H04N 21/25* (2011.01)

(52) U.S. Cl.
CPC ............ *H04L 65/4084* (2013.01); *H04L 67/16* (2013.01); *H04N 21/251* (2013.01); *H04N 21/6405* (2013.01); *H04N 21/6408* (2013.01)

(58) Field of Classification Search
CPC ............ H04L 65/1023–65/4084; H04L 67/16; H04N 21/00–21/658
See application file for complete search history.

(56) References Cited

U.S. PATENT DOCUMENTS

| | | |
|---|---|---|
| 2005/0114794 A1 | 5/2005 | Grimes et al. |
| 2006/0020995 A1* | 1/2006 | Opie ............. H04N 21/23424 725/117 |
| 2008/0059646 A1* | 3/2008 | Ludvig ............ H04N 21/2385 709/231 |
| 2009/0293093 A1 | 11/2009 | Igarashi et al. |
| 2011/0138423 A1* | 6/2011 | Pickelsimer ....... H04N 5/44543 725/46 |
| 2011/0219412 A1* | 9/2011 | Cooper ................. H04N 7/173 725/109 |
| 2013/0014159 A1 | 1/2013 | Wiser et al. |
| 2013/0046849 A1* | 2/2013 | Wolf .................. H04L 67/2842 709/217 |
| 2014/0047473 A1* | 2/2014 | Sankaran ......... H04N 21/44222 725/34 |
| 2014/0082670 A1* | 3/2014 | Papish .............. H04N 21/4532 725/45 |

OTHER PUBLICATIONS

International Search Report and Written Opinion issued in PCT/US2015/030624 on Dec. 17, 2015, 11.

* cited by examiner

*Primary Examiner* — Nicholas Taylor
*Assistant Examiner* — Clayton R Williams
(74) *Attorney, Agent, or Firm* — Morris & Kamlay LLP (57) ABSTRACT

Described are systems and methods for simulating a traditional television experience with streamed on-demand content. Streamed content may be buffered to allow a user to preview content even when the content is not organized in a traditional numbered channel format. A user may progress through a series of content items (e.g. simulated channel up/down) in order to preview the on-demand content without having to unduly wait for each content item to load and/or buffer.

16 Claims, 4 Drawing Sheets

SIMULATING BROADCAST TELEVISION CHANNEL SURFING FOR ON-DEMAND CONTENT

BACKGROUND

Current content streaming systems often approach a user's viewing experience as a computer interaction rather than a traditional television viewing experience. Accordingly, these systems often present vast amounts of content to users which require navigating through an endless hierarchy of menus and interacting with cumbersome search boxes. In addition, these systems often assume users know exactly what they want to watch, which typically constitutes a small percentage of time a user spends in front of a television. As a result, these systems often fail to recognize the pleasure of visually previewing content as users "surf" through countless channels in order to determine what to watch. Thus, current content streaming systems often diminish the overall enjoyment of a television interaction experience.

BRIEF SUMMARY

In an implementation, described is a method that includes sending, to a server and from a device associated with a user, a request to watch a first content item, and receiving, from the server and at the device, a first content stream corresponding to the first content item. The method may include providing, by the device for output to a display operatively coupled to the device, the first content item, and receiving, from the server and prior to sending a request to watch a different content item, a set of content streams corresponding to a set of recommended content items based on profile information of the user. The method may also include buffering, at the device, the received set of content streams, and providing, by the device for output to the display and in response to an indication from the user to watch a next content item, a substantially instant preview of a second content item from the buffered set of content streams.

In an implementation, described is a method that includes receiving, at a server and from a device associated with a user, a request to watch a first content item, and providing, by the server and to the device, a first content stream corresponding to the first content item. The method may include determining, by the server, a set of recommended content items based on profile information of the user, and providing, by the server and prior to receiving from the device a request to watch a different content item, a set of content streams corresponding to the determined set of recommended content items. In addition, the set of content streams may be buffered by the device for displaying a substantially instant preview of a second content item in response to an indication from the user to watch a next content item.

In an implementation, described is a device including a processor that may be configured to send, to a server and from the device associated with a user, a request to watch a first content item, and receive, from the server and at the device, a first content stream corresponding to the first content item. The processor may be configured to provide, by the device for output to a display operatively coupled to the device, the first content item, and receive, from the server and prior to sending a request to watch a different content item, a set of content streams corresponding to a set of recommended content items based on profile information of the user. In addition, the processor may be configured to buffer, at the device, the received set of content streams, and provide, by the device for output to the display and in response to an indication from the user to watch a next content item, a substantially instant preview of a second content item from the buffered set of content streams.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Traditionally, content available in an "on-demand" manner would typically supplement a broadcast television subscription. An increasing number of users, however, have "cut the cord" and no longer subscribe to broadcast television from cable providers. These users often access on-demand content through separate third-party providers. For example, an increasing number of users rely on over the top providers that provide content over IP networks. Thus, it is often the case that a user only has access to on-demand content, and accordingly, must explore the perceived limitless amount of on-demand content titles whenever they are in front of their television. Current on-demand interfaces, however, often assume users know exactly what they want to watch and treat users interacting with a streaming device as a "computer user" rather than a "viewer." By utilizing such an analogy, a traditional satisfying channel "surfing" experience is prevented. For example, users often take pleasure in the immediate limbic effect only provided by visually previewing content. Moreover, users often enjoy the somewhat addictive pleasure of scanning through content in search of something they want to watch. In contrast, current on-demand interfaces often include elaborate text guides meant to facilitate quick surveying of available programming. But reading text requires the kind of cognitive effort that a user often attempts to avoid when watching television. Moreover, actually previewing content provides a better gauge what a user may want to watch.

Described herein are systems and methods for simulating a traditional broadcast television experience with on-demand content. In implementations described herein, content may be organized and buffered using various techniques to allow a user to surf through content even when accessing content does not necessarily involve tuning into a particular numbered channel. Accordingly, a user may progress through a series of streamed content items (e.g. simulating a channel up/down) for previewing without having to unduly wait for each content item to load. Thus, the techniques described herein remove the obstacles of a satisfying content surfing experience and restore grazing and serendipity to their rightful place in front of a television.

Channel surfing (also known as channel hopping) generally relates to the practice of quickly scanning through different television channels to find something interesting to watch. The term surfing as described herein may include previewing content by navigating through content items with actions such as changing channels, next, and similar operations. For example, a next content item or a channel up/down (or other command to switch or progress to another content item) may constitute surfing or previewing content as referred to herein. Typically, the content item is a video, which may include a movie, television program, clip, etc. The content item may also include audio, which may include radio stations, songs, etc. Content items as referred to herein, unless otherwise noted, include content that is provided in an on-demand basis, which may be distinguished from real time or live television. On-demand content (or video-on-demand (VOD) content) may be accessed (e.g. downloaded or streamed) by the device for viewing at any time. On-demand content may also include content that may be provided through a subscription or pay-pay-view service. For example, content providers often provide a service that allows a user to access an unlimited amount of content for a monthly subscription fee. It should be noted that not all television programming may be accessed in an on-demand manner. Content providers often distinguish between content that may be accessed on-demand versus live television due to content licensing restrictions. For example, live television content may be subject to certain licensing restrictions such as limiting access to the content only during the scheduled time slot or on a time-shifted basis if the live program is recorded using a digital video recorder (DVR). Moreover, live television is typically provided as a broadcast (e.g. multicast) to devices, and accordingly, not within the purview of content items as referred to herein.

Figure 1:
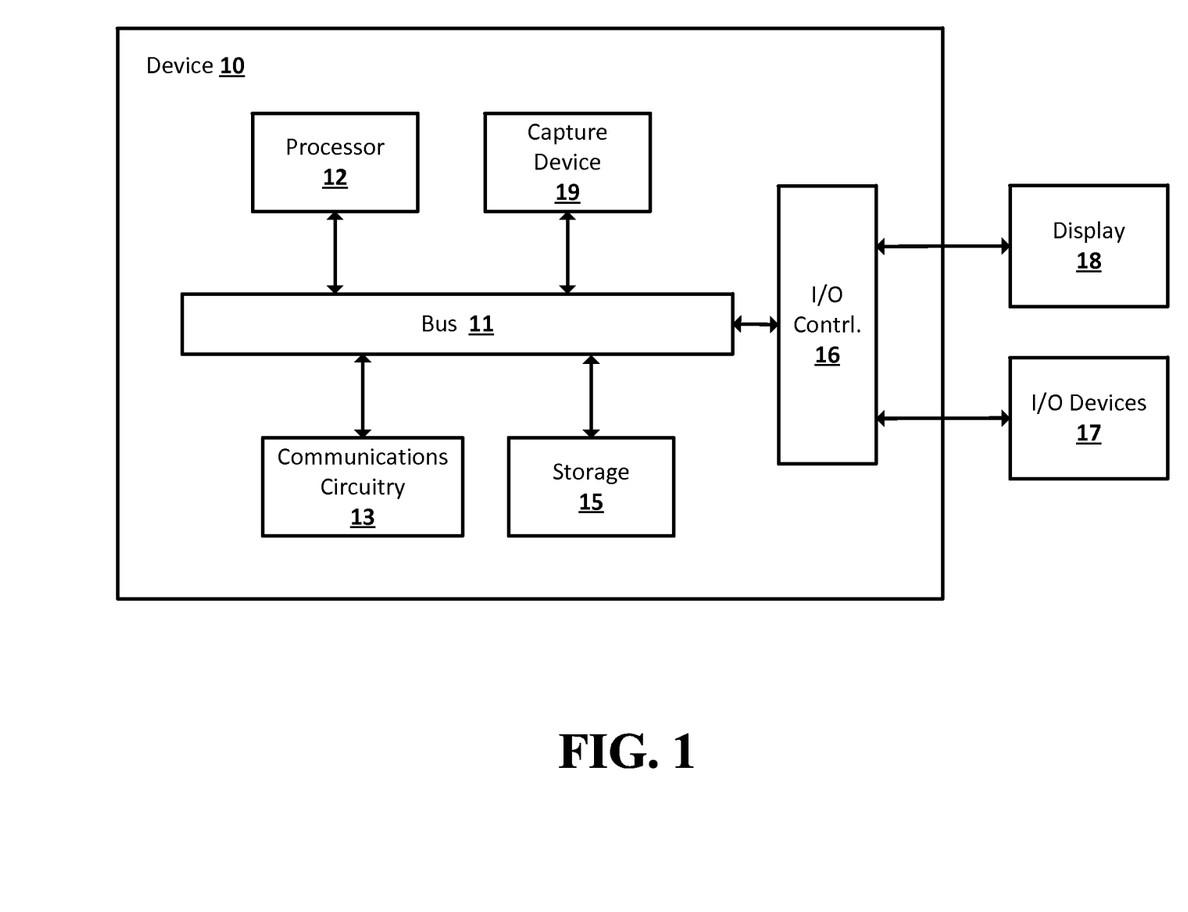
FIG. 1 illustrates a block diagram of a device according to an implementation of the disclosed subject matter.

FIG. 1 illustrates a block diagram of a device according to an implementation of the disclosed subject matter. The device 10 (or computing device) may include or be part of a variety of types of devices, such as a set-top box, television, media player, mobile phone (including a "smartphone"), computer, or other type of device. The processor 12 may be any suitable programmable control device and may control the operation of one or more processes, such as content delivery as discussed herein, as well as other processes performed by the device 10. The bus 11 may provide a data transfer path for transferring between components of the device 10.

The communications circuitry 13 may include circuitry for wired or wireless communications for short-range and/or long range communication. For example, the wireless communication circuitry may include Wi-Fi enabling circuitry for one of the 802.11 standards, and circuitry for other wireless network protocols including Bluetooth, the Global System for Mobile Communications (GSM), and code division multiple access (CDMA) based wireless protocols. Communications circuitry 13 may also include circuitry that enables the device 10 to be electrically coupled to another device (e.g. a computer or an accessory device) and communicate with that other device. For example, a wearable device such as a watch may communicate with the device 10 through the communication circuitry 13 using a short-range communication technique such as infrared (IR) or other suitable technique.

The storage 15 may store software (e.g., for implementing various functions on device 10), and any other suitable data. The storage 15 may include a non-transitory storage medium including various forms volatile and non-volatile memory. For example, the storage 15 may include any form of non-volatile memory such as read-only memory (ROM), electrically erasable programmable read only memory (EEPROM), a hard-drive, solid state drive, flash drive, and the like, or any suitable volatile memory including various types of random access memory (RAM) and the like. The storage 15 may be integral with the device 10 or may be separate and accessed through an interface such as a memory card, USB drive, optical disk, a magnetic storage medium, and the like.

An I/O controller 16 may allow connectivity to a display 18 and one or more I/O devices 17. The I/O controller 16 may include hardware and/or software for managing and processing various types of I/O devices 17. The I/O devices 17 may include various types of devices allowing a user to interact with the device 10. For example, the I/O devices 17 may include various input components such as a keyboard/keypad, controller (e.g. game controller, remote, etc.) including a smartphone that may act as a controller, a microphone, and other suitable components. The I/O devices 17 may also include components for aiding in the detection of gestures including wearable components such as a watch, ring, or other components that may be used to track body movements (e.g. holding a smartphone to detect movements).

Figure 2:
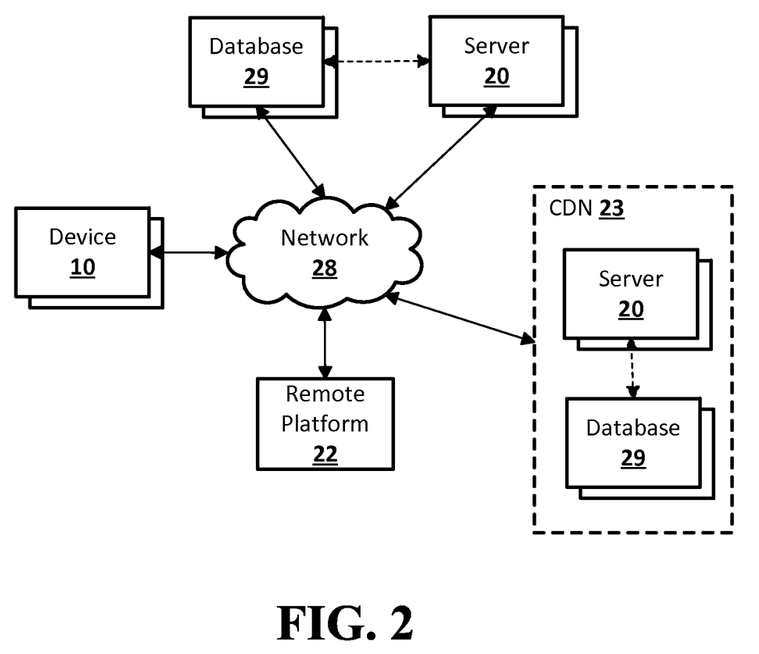
FIG. 2 illustrates an example network arrangement according to an implementation of the disclosed subject matter.

The device 10 may be or may not be coupled to a display. In implementations where the device 10 is coupled to a display (as shown in FIGS. 1 and 2), the device 10 may be integrated with or be part of a display 18 (e.g. integrated into a television unit). The display 18 may be any a suitable component for displaying visual output such as a television, computer screen, projector, and the like. The display 18 may include an interface that allows a user to interact with the display 18 or additional components coupled to the device 10. The interface may include menus, overlays, and other display elements that are displayed on a display screen to provide visual feedback to the user.

The device 10 may include a capture device 19 (as shown in FIGS. 1 and 2). Alternatively, the device 10 may be coupled to the capture device 19 through the I/O controller 16 in a similar manner as described with respect to a display 18. For example, a computing device (e.g. server and/or a remote processor) may receive data from a capture device 19 (e.g. webcam or similar component) that is local to the user. The capture device 19 enables the device 10 to capture still images, video, or both. The capture device 19 may include one or more cameras for capturing an image or series of images continuously, periodically, at select times, and/or under select conditions. The capture device 19 may be used to visually monitor one or more users such that gestures and/or movements performed by the one or more users may be captured, analyzed, and tracked to detect a gesture input as described further herein.

FIG. 2 illustrates an example network arrangement according to an implementation of the disclosed subject matter. The network 28 may be a local network, wide-area network (including the Internet), or any other suitable communication network, and may be implemented on any suitable platform including wired and wireless technologies. A device 10 may communicate with another device 10 and one or more servers 20 and/or databases 29. A server 20 may be directly accessible by a device 10, or one or more other devices 10 may provide intermediary access to a server 20. A device 10 and server 20 may access a remote platform 22 or services provided by a remote platform 22 such as cloud computing arrangements and services. The remote platform 22 may include one or more servers 20 and databases 29. The term server may be used herein and may include a single server or one or more servers, which may include or be part of, a remote platform 22 and/or a Content Delivery Network (CDN) 23. For example, a server 20 may include one or more servers responsible for authentication, billing, and storing and/or delivering content (which may be part of a CDN 23), or any combination thereof including additional or fewer types of servers.

Figure 3:
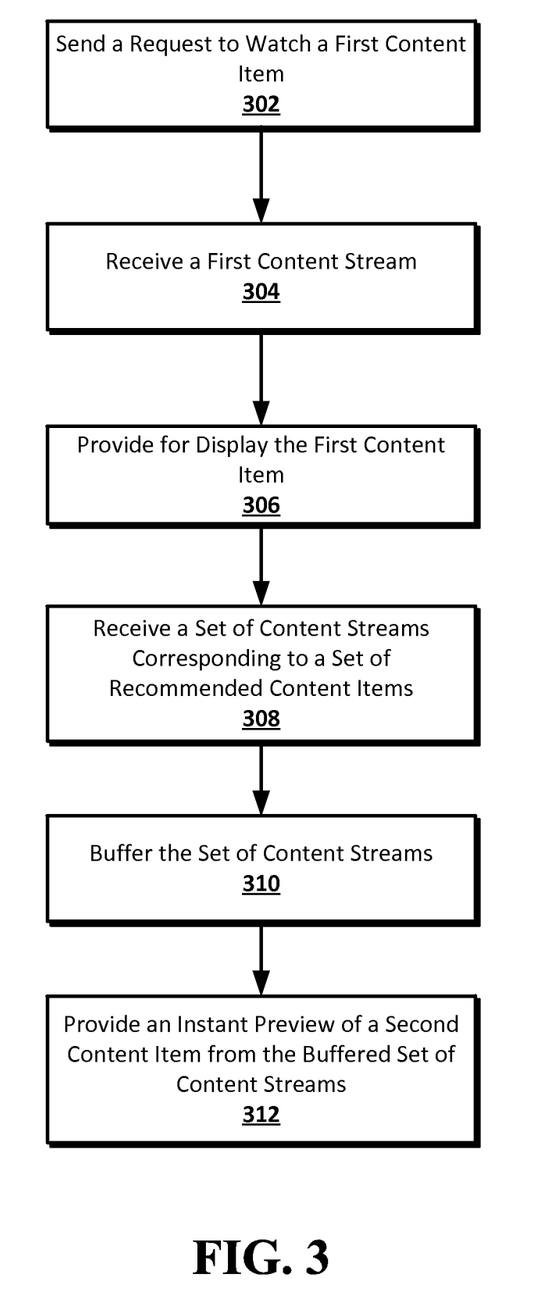
FIG. 3 illustrates a flow diagram of receiving a set of on-demand content streams for buffering according to an implementation of the disclosed subject matter.

FIG. 3 illustrates a flow diagram of receiving a set of on-demand content streams for buffering according to an implementation of the disclosed subject matter. In 302, a device (e.g. device 10) may send to a server (e.g. server 20) a request to watch a first content item. The device may connect to the server via a network (e.g. network 28) in order to receive content. The request to watch a first content item may include a selection of a particular content title. For example, a user may select a particular movie or television program to watch from a media interface displayed by the device. In some implementations, the user may request content by selecting a particular channel, which may or may not be associated with a numeric value. Due to the nature of on-demand content, an interface may not necessarily associate a channel with a number. For example, the channel may be represented by a network station name or identifier (e.g. PBS). In such instances, channels may be ordered using various techniques such as alphabetical or a personalized order based on user profile information. The user may also request content by selecting an option to preview (e.g. surf) content items within a particular category. For example, categories may include new releases, popular, recommended, etc. In another example, categories of content may include genres. For example, the interface may include genres such as action, comedy, drama, suspense, horror, documentary, independent, kids, sports, etc. For instance, the user may request to preview action movies in order to surf through content items categorized as action movies. In addition, a user may select previewing content items that a user has tagged, which may include for example, content items that have been tagged as favorites or added to a playlist.

In 304, the device may receive, from the server, a first content stream corresponding to the first content item. The server may provide the requested content using, for example, a suitable streaming technique. The streaming technique may include, for example, Real Time Streaming Protocol (RTSP), HTTP Live Streaming (HLS), Dynamic Adaptive Streaming over HTTP (DASH), HTML 5, or other current or future content streaming protocols or techniques. As described above, the content items as referred to herein may be classified as on-demand content. Accordingly, the server may provide the content using a streaming protocol generally described as a unicast transmission whereas the server may provide other forms of content, such as live television, using streaming protocols generally described as a multicast transmission. For example, a server (e.g. content server) may transmit a unicast transmission (e.g. a streamed content item) to a single device (e.g. set-top-box) that is identified by a unique address.

In 306, the device may provide, for output to a display operatively coupled to the device, the first content item. For example, the device may include a set-top-box that provides the content item as output on a television to which it is coupled. In order to allow a user to preview additional content items without delay (e.g. substantially instantly as further described herein), the device may automatically receive additional content streams from the server.

In 308, the device may receive, from a server, a set of content streams. The set of content streams may include additional content not streamed to the device. The set of content streams may be received by the device prior to the device (e.g. user) sending a request to watch a different content item. For example, the request to watch a different content item may include a user action such as a channel change or next item. Accordingly, these additional streams are received in anticipation of an eventual request to watch a different item by the user. By sending content in anticipation of such a request, the device may buffer content in order to provide an experience similar to surfing traditional broadcast television. For example, with traditional broadcast television, the analog broadcast signal includes a signal for each available channel, and accordingly, the television tuner merely "tunes" into a different channel in response to the user changing the channel. In contrast, on-demand content typically only streams content for the currently viewed content item. For example, on-demand interfaces typically only buffer content upon ordering or upon a selection of the content item by the user. In order to watch another content item in such an interface, the user must exit, or end a viewing session, and then navigate through menus to select another item. Once the user has selected another item, the user must then wait for the item to load (e.g. stream a sufficient amount of data) before the user can begin viewing the content item. This loading process in increasingly burdensome with the advent of high definition content that requires considerable amounts of bandwidth. Accordingly, surfing or relatively quick previewing of content is essentially non-existent with current on-demand interfaces. As described herein, the device may receive a set of streams ahead of time, and accordingly, may provide a preview of additional content items from data that is already buffered.

The set of content streams received by the device may correspond to a set of recommended content items. For example, if 5 content items are to be buffered, a corresponding set of 5 content streams may be received by the device. The content items may be based on recommendations, which may be determined by the device, or alternatively, by the server. In an implementation, the recommendations may be based on the first content item requested by the user and already streamed to the device. For example, if the user is watching an action movie, additional action movies may be included in the set of recommended content items. In another example, the set of recommendations may include a breadth of genres to provide a variety of previewable content to the user. In addition, the set of recommended content items may include random content in order to facilitate the serendipitous discovery of content by the user. The recommendations may also be based on profile information of the user. For example, the profile information may include a viewing history of the user. This may include viewing preferences such as the type of content the user prefers. For example, preferences may be determined based on content genres of items previously viewed as well as other preferences relating to actors, directors, writers, producers, etc. This viewing history may also include viewing behavior based on explicit or implicit information. For example, explicit information may include user defined preferences or user provided ratings. For instance, a user may rate content on a ratings scale (e.g. 1 to 5), or like/dislike content items. Implicit information may be determined based on, for example, determining the length of time a user views a particular content item. In another example, if it is determined that a user changes channels during a scene identified as a scary, the recommendations may not include content or scenes that are similarly categorized. The profile information may also include demographic information of the user. For example, popular content items from other users with similar demographic characteristics may be included in the recommendation set. It should be noted that a user may also set preferences to remain anonymous or to not store profile information such as a viewing history or demographic information.

In an implementation, a received content stream may commence streaming from a predefined scene. For example, a predefined scene may be associated with an identifier indicating a type of scene. These may include identifiers such as, for example, action, dramatic, suspenseful, comedic, romantic, and scary to describe a particular scene. For example, if it is determined based on profile information that the user has a preference for action movies, one or more streams within the received set of streams may commence from a scene identified as an action sequence. Accordingly, the device may provide the user with a more informative preview by commencing the content item at an interesting juncture. When content is provided from a particular scene, the device may provide an option to commence streaming from the beginning of the previewed item. In addition, a stream may commence from a resume point based on the user previously viewing a particular content item. For example, if the user previously watched the first half of a movie, the movie may commence from the point at which the user ended the previous viewing session. In another example, the content items may include movie trailers, and thus, a user may be able to preview multiple trailers before selecting a particular movie.

In an implementation, the device may organize content by including channels, and accordingly, content streams may be associated with a particular channel. For example, channels may be ordered and identified by numbers. In another example, the channels may not be identified with numbers, but rather genres of content. For instance, the interface may include a channel for action movies and another channel for comedies and so on. In implementations where the content is associated with channels, the received set of content streams may be associated with a set of channels adjacent to the currently viewed channel. For example, if a user is watching content on channel 10, the received content streams may correspond to content for channels 5-9 and 11-15.

In 310, the device may buffer the received set of content streams. The device may buffer, to a storage (e.g. storage 15) and while providing for display the first content item, the set of received content streams. As described above, the interface may organize content using a set of channels. In such implementations, the device may buffer channels adjacent to the currently viewed channel (e.g. channel corresponding to the first content item). In addition, the device may buffer multiple content items and employ an efficient buffering technique. The device may buffer each content stream of the set of content streams based on a proximity of each associated channel relative to the first channel (e.g. currently viewed channel). For example, a pyramid technique may be employed to buffer the content items closest to the currently viewed content item to a greater extent than those content items further away in the set. The device may also buffer content streams based on the amount of time a user watches content items. For example, if the user's viewing habits (e.g. viewing history of user) includes switching between channels constantly (e.g. every few seconds), the number of content streams and the amount of data may be buffered accordingly. For instance, a greater number of content streams may be buffered compared to a user with a history of watching content for longer periods of time. In another example, the device may buffer a greater amount of data if it is determined that a user views (e.g. surfs) content by watching each content item for a longer period of time. Accordingly, in order to continuously provide content streams without delay, the set of streams provided to the device may be dynamically adapted based on the viewing behavior of the user.

Figure 4:
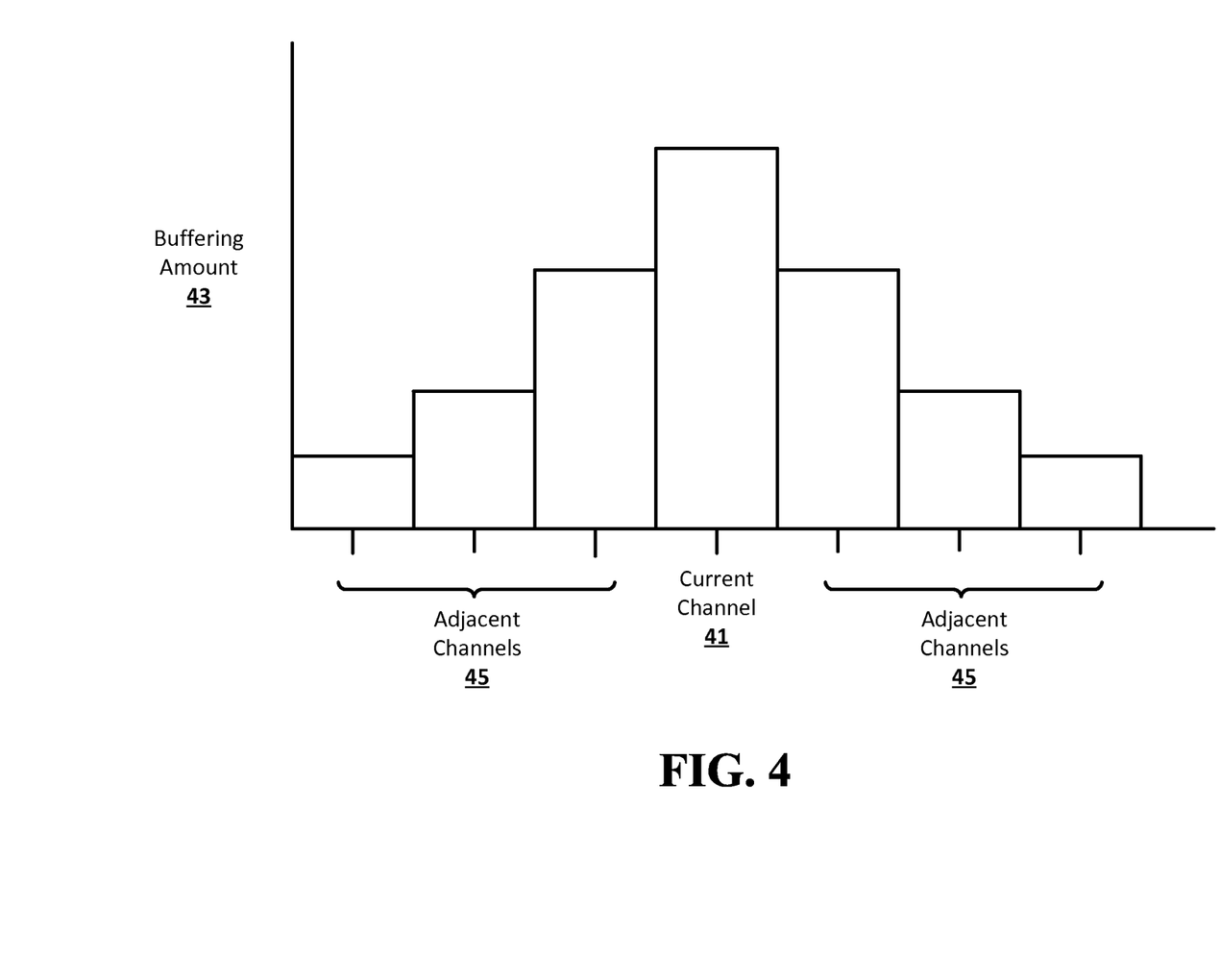
FIG. 4 illustrates an example diagram of a technique to buffer data according to an implementation of the disclosed subject matter.

FIG. 4 illustrates an example diagram of a technique to buffer data according to an implementation of the disclosed subject matter. As shown, the buffering employs a pyramid technique, and accordingly, the buffering amount 43 of a current channel 41 is greater than adjacent channels 45. As shown, the buffering amount 43 may decrease based on the proximity to the current channel 41. For example, using the example above where the current channel is channel 10 and the received content streams correspond to channels 5-9 and 11-15, the device may buffer channels 9 and 11 to the greatest extent and buffer channels 8-5 and 12-15 in relatively decreasing manner. By buffering content items from various streams, the device may provide a series of content more efficiently (e.g. without undue delay) when a user wishes to surf through content items.

Returning to FIG. 3, in 312, the device may provide, for output to the display, a substantially instant preview of a second content item from the buffered set of content streams. The device may provide the preview in response to an indication from the user to watch a next content item. As described above, the preview may include streaming content from a particular point of the content item (e.g. a particular scene), or may commence streaming from the beginning of the content item. When a user wishes to watch another content item, the device may receive an indication to watch a next content item. The indication may include, for example, a channel up/down action, or other input action such as a next, previous, etc. As described above, the device may provide a substantially instant preview of content items. As referred to herein, substantially instant refers to the ability to display the content item without the delay typically required download a sufficient amount of data to commence playback of at least a portion of the content item. Put another way, substantially instantly refers to the ability for the device to immediately display the content item as a sufficient amount of data has already been buffered. Accordingly, the delay between displaying a next item of content relates to the minimal amount of time required to access the buffered data stored on the device. Thus, the device may display a preview of the content without delay in a manner similar to changing channels with traditional broadcast television. As described above, the content items referred to herein are provided as on-demand content, which may be provided as a unicast transmission from a server. To further simulate traditional broadcast television, the device may also simulate a channel change for an analog television. For example, the simulated channel change may include a simulated visual effect or audio effect such as a static effect or a white noise effect.

In addition to providing streamed content items, content providers may provide advertising to the user. Current on-demand systems often provide advertising upon commencement of viewing each content item, and accordingly, a user must endure an advertisement each time the user wishes to view another item. In implementations, the device or server, may account for a user wishing to surf content without being bombarded with advertisements, and accordingly, only serve an advertisement upon an indication that the user intends to continue watching a particular content item. For example, after watching a content item for a predefined duration, the content provider may serve a contextual advertisement. The predefined duration may also be based on a cumulative time the user has been surfing through content items. For example, an advertisement may be provided every 10 minutes regardless of whether the user has been watching a single content item, or has been watching multiple items of content. In order to determining which advertisements serve to a user, the advertisements may be associated with particular content items (e.g. content titles), or may be associated with particular scenes within a content item. For example, upon displaying an action sequence for a particular movie involving a car chase, a relevant advertisement from a car manufacturer may be provided. The advertisement may also be based on profile information of the user. For example, the advertisement may be based on particular preferences or demographic information of the user. In addition, the device or server, may provide an option to purchase access to a content item. For example, the user may be prompted to order (e.g. rent or buy) the title in order to continue watching the content item. Accordingly, the content providers may deliver advertisements and additional content without hindering the television surfing experience.

Various implementations may include or be embodied in the form of computer-implemented process and an apparatus for practicing that process. Implementations may also be embodied in the form of a computer-readable storage containing instructions embodied in a non-transitory and tangible storage and/or memory, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular feature, but every implementation may not necessarily include the feature. Moreover, such phrases are not necessarily referring to the same implementation. Further, when a particular feature is described in connection with an implementation, such feature may be included in other implementations whether or not explicitly described. The term "substantially" may be used herein in association with a claim recitation and may be interpreted as "as nearly as practicable," "within technical limitations," and the like. Terms such as first, second, etc. may be used herein to describe various elements, and these elements should not be limited by these terms. These terms may be used to distinguish one element from another. For example, a first content stream may be termed a second content stream, and, similarly, a second content stream may be termed a first content stream.

The foregoing description, for purpose of explanation, has been described with reference to specific implementations. However, the illustrative discussions above are not intended to be exhaustive or to limit implementations of the disclosed subject matter to the precise forms disclosed. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
sending, to a server and from a device associated with a user, a request to watch a first content item;
receiving, from the server and at the device, a first unicast content stream corresponding to the first content item;
providing, by the device for output to a display operatively coupled to the device, the first content item;
receiving, from the server and prior to sending a request to watch a different content item, a set of unicast content streams corresponding to a set of recommended content items based on profile information of the user;
buffering, at the device, the received set of content streams; and
providing, by the device for output to the display and in response to an indication from the user to watch a next content item, a substantially instant preview of a second content item from the buffered set of content streams, wherein the received first content stream is associated with a first channel and the received set of content streams are associated with a set of channels, and wherein buffering the received set of content streams comprises buffering each content stream of the set of content streams based on a proximity of each associated channel relative to the first channel, wherein more of a content stream of the set of content streams that is associated with a channel of the set of channels that is adjacent to the first channel is buffered than a content stream of the set of content streams that is associated with a channel of the set of channels that is not adjacent to the first channel.

2. The method of claim 1, wherein buffering the received set of content streams comprises buffering each content stream of the set of content based on an amount of time the user views the first content item.

3. The method of claim 1, wherein each of the received content streams commence streaming from a predefined scene in the corresponding content item.

4. The method of claim 3, wherein the predefined scene is associated with an identifier indicating a type of scene, the identifier comprising at least one of action, dramatic, suspenseful, comedic, romantic, and scary.

5. The method of claim 3, wherein the predefined scene is based on a resume point of a previous viewing session of the corresponding content item.

6. The method of claim 1, further comprising providing, by the device and while providing the preview of the second content item, an option to purchase access to the second content item.

7. A method, comprising:
receiving, at a server and from a device associated with a user, a request to watch a first content item;
providing, by the server and to the device, a first unicast content stream corresponding to the first content item;
determining, by the server, a set of recommended content items based on profile information of the user; and
providing, by the server and prior to receiving from the device a request to watch a different content item, a set of unicast content streams corresponding to the determined set of recommended content items, the set of content streams to be buffered by the device for displaying a substantially instant preview of a second content item in response to an indication from the user to watch a next content item, wherein the provided first unicast content stream is associated with a first channel and the provided set of unicast content streams are associated with a set of channels, and wherein providing each unicast content stream of the set of unicast content streams to be buffered is based on a proximity of each associated channel relative to the first channel, wherein more of a unicast content stream of the set of unicast content streams that is associated with a channel of the set of channels that is adjacent to the first channel is provided to be buffered than a unicast content stream of the set of unicast content streams that is associated with a channel of the set of channels that is not adjacent to the first channel.

8. The method of claim 7, further comprising providing, by a server, an advertisement based on profile information of the user upon a determination that the second content item has been viewed for a predefined duration.

9. The method of claim 7, wherein the provided set of content streams comprises movie trailers of the recommended content items.

10. The method of claim 7, wherein the set of content items are not associated with a numeric channel.

11. The method of claim 7, wherein displaying the substantially instant preview comprises simulating a channel change for an analog television broadcast.

12. A device, comprising:
a processor configured to:
send, to a server and from the device associated with a user, a request to watch a first content item;
receive, from the server and at the device, a first unicast content stream corresponding to the first content item;
provide, by the device for output to a display operatively coupled to the device, the first content item;
receive, from the server and prior to sending a request to watch a different content item, a set of unicast content streams corresponding to a set of recommended content items based on profile information of the user;
buffer, at the device, the received set of content streams; and
provide, by the device for output to the display and in response to an indication from the user to watch a next content item, a substantially instant preview of a second content item from the buffered set of content streams, wherein the received first content stream is associated with a first channel and the received set of content streams are associated with a set of channels, and wherein the processor is further configured to buffer the received set of content streams based on a proximity of each associated channel relative to the first channel, wherein more of a content stream of the set of content streams that is associated with a channel of the set of channels that is adjacent to the first channel is buffered than a content stream of the set of content streams that is associated with a channel of the set of channels that is not adjacent to the first channel.

13. The device of claim 12, wherein the received set of content streams are buffered based on a proximity of each associated channel relative to the first channel.

14. The device of claim 12, wherein the received set of content streams are buffered based on an amount of time the user views the first content item.

15. The device of claim 12, wherein each of the received content streams commence streaming from a predefined scene in the corresponding content item.

16. The device of claim 12, the processor further configured to provide, by the device and while providing the preview of the second content item, an option to commence streaming from a beginning of the second content item.

* * * * *